United States Patent
Papakipos et al.

(10) Patent No.: US 8,271,995 B1
(45) Date of Patent: Sep. 18, 2012

(54) SYSTEM SERVICES FOR NATIVE CODE MODULES

(75) Inventors: Matthew Papakipos, Palo Alto, CA (US); Antoine Labour, Mountain View, CA (US)

(73) Assignee: Google Inc., Mountain View, CA (US)

(*) Notice: Subject to any disclaimer, the term of this patent is extended or adjusted under 35 U.S.C. 154(b) by 768 days.

(21) Appl. No.: 12/415,434

(22) Filed: Mar. 31, 2009

Related U.S. Application Data

(60) Provisional application No. 61/113,087, filed on Nov. 10, 2008.

(51) Int. Cl.
*G06F 3/00* (2006.01)
*G06F 17/00* (2006.01)
(52) U.S. Cl. .................................. 719/310; 726/1
(58) Field of Classification Search ............ 719/310; 726/1
See application file for complete search history.

(56) References Cited

U.S. PATENT DOCUMENTS

| | | | |
|---|---|---|---|
| 6,941,396 B1* | 9/2005 | Thorpe et al. ................ 710/74 |
| 7,162,612 B2* | 1/2007 | Henry et al. ................. 712/209 |
| 7,260,718 B2* | 8/2007 | Burnett et al. ............... 713/167 |
| 7,350,204 B2* | 3/2008 | Lambert et al. .............. 717/172 |
| 2007/0005661 A1* | 1/2007 | Yang ......................... 707/200 |
| 2009/0282474 A1 | 11/2009 | Chen et al. |
| 2009/0282477 A1 | 11/2009 | Chen et al. |
| 2010/0121893 A1 | 5/2010 | Uhrhane et al. |

OTHER PUBLICATIONS

Nataraj Nagaratnam, The Security Architecture for Open Grid Service, Jul. 17, 2002.*

* cited by examiner

*Primary Examiner* — Lechi Truong
(74) *Attorney, Agent, or Firm* — Fish & Richardson P.C.

(57) ABSTRACT

Some embodiments provide a system that facilitates the execution of a native code module. During operation, the system obtains a service registry comprising a set of service modules and determines a set of system services required by the native code module. Next, the system selects one or more of the service modules providing the system services. Finally, the system enables the system services for the native code module by providing an inter-module communication (IMC) runtime that facilitates communication between the native code module and the one or more service modules.

20 Claims, 2 Drawing Sheets

SYSTEM SERVICES FOR NATIVE CODE MODULES

RELATED APPLICATION

This application hereby claims priority under 35 U.S.C. §119 to U.S. Provisional Application No. 61/113,087, entitled "MICRO-KERNEL ARCHITECTURE FOR SYSTEM SERVICES FOR NATIVE CLIENT" by Matthew Papakipos and Eric Uhrhane filed 10 Nov. 2008.

The subject matter of this application is related to the subject matter in a co-pending non-provisional application by inventors J. Bradley Chen, Matthew T. Harren, Matthew Papakipos, David C. Sehr, and Bennet S. Yee, entitled "Method for Validating an Untrusted Native Code Module," having Ser. No. 12/117,634, and filing date 8 May 2008.

The subject matter of this application is also related to the subject matter in a co-pending non-provisional application by inventors J. Bradley Chen, Matthew T. Harren, Matthew Papakipos, David C. Sehr, Bennet S. Yee, and Gregory Dardyk, entitled "Method for Safely Executing an Untrusted Native Code Module on a Computing Device," having Ser. No. 12/117,650, and filing date 8 May 2008.

BACKGROUND

1. Field

The present embodiments relate to techniques for executing native code modules. More specifically, the present embodiments relate to a method and system for providing system services to native code modules.

2. Related Art

Easy access to computers and plentiful network bandwidth have facilitated sharing of information and applications. For instance, a user can easily install and execute an application which is downloaded from a web site or received from a friend as an email attachment. However, installing and executing such applications on a given computing device involves a level of trust. Because such applications are often executed with inadequate security mechanisms, a user must implicitly trust that the application does not include any malicious code. Some applications exploit such blind trust, however, by including "viruses" that can damage or erase information on the computing device, and can replicate and propagate themselves to other vulnerable devices on the network.

Some techniques have been developed to mitigate the negative impacts of viruses. For instance, some interpreted languages seek to reduce the risks involved in executing unknown code by limiting the ability of a language to specify unsafe operations. Alternatively, virtual machine execution environments facilitate running guest operating systems on completely virtualized hardware (which executes on actual hardware), thereby isolating untrusted applications to their own virtual machines to reduce security risks. However, code written for such approaches typically has a significant performance disadvantage in comparison to executing native code.

Hence, what is needed is a method that provides security without the performance limitations of existing techniques.

SUMMARY

Some embodiments provide a system that facilitates the execution of a native code module. During operation, the system obtains a service registry comprising a set of service modules and determines a set of system services required by the native code module. Next, the system selects one or more of the service modules providing the system services. Finally, the system enables the system services for the native code module by providing an inter-module communication (IMC) runtime that facilitates communication between the native code module and the one or more service modules.

In some embodiments, the system also adds a new service module to the service registry. Next, the system enables, for the native code module, additional system services provided by the new service module through the IMC runtime without affecting existing system services available to the native code module from the service modules.

In some embodiments, the system also restricts access to the system services from the native code module based on a security policy for the native code module.

In some embodiments, the system also executes each of the service modules with a set of reduced privileges.

In some embodiments, the reduced privileges are enforced by limiting access to system calls from the service modules.

In some embodiments, the system services correspond to at least one of filesystem access, graphics command buffer rendering, audio processing, and network access.

In some embodiments, each of the service modules is executed locally or remotely.

In some embodiments, the IMC runtime provides an IMC channel between the native code module and each of the one or more service modules.

DETAILED DESCRIPTION

Figure 1:
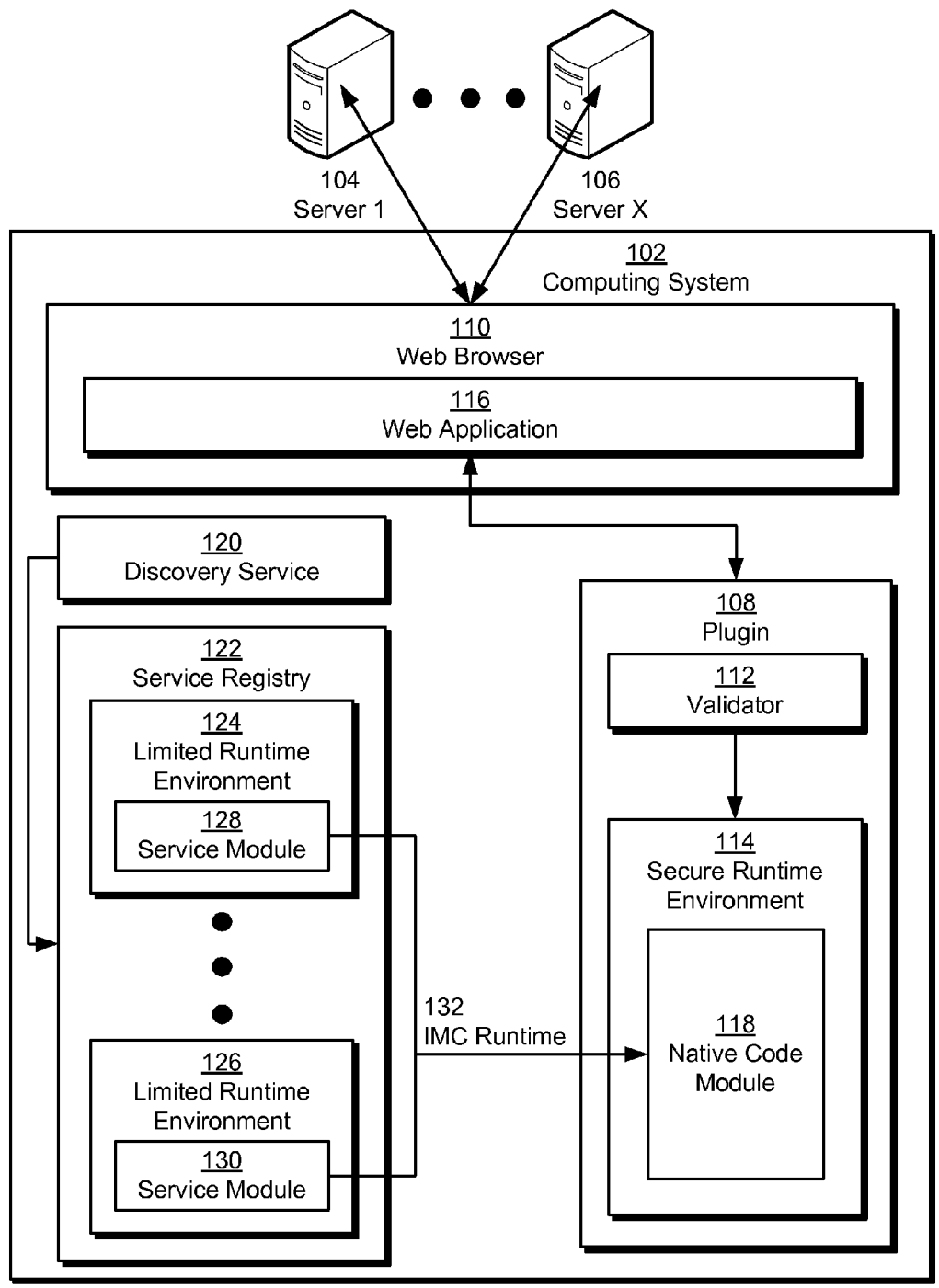
FIG. 1 shows a schematic of an embodiment of a system.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the system is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for facilitating the execution of a native code module. The native code module may contain native code that is executed within a secure runtime environment that isolates the native code module from sensitive data and resources on the computing system. The native code module may additionally be validated prior to execution within the secure runtime environment to ensure that the native code module complies with a set of security constraints. Furthermore, the native code module may be used to perform computationally intensive operations for a web application executing within a web browser.

More specifically, embodiments provide a method and system for providing system services to the native code module. Such system services may include filesystem access, hardware-accelerated graphics processing (e.g., graphics command buffer rendering), audio processing, and/or network access (e.g., peer-to-peer, HyperText Transfer Protocol (HTTP), etc.). The system services may be provided by service modules that are executed locally or remotely with respect to the native code module. Communication between the service modules and the native code module may be facilitated by an inter-module communication (IMC) runtime. In addition, security associated with the native code module may be enforced by limited runtime environments that execute the service modules with reduced privileges.

FIG. 1 shows a schematic of an embodiment of a system. The system includes a computing system 102 and a set of servers (e.g., server 1 104, server x 106). Computing system 102 includes a web application 116 running within a web browser 110, a plugin 108, a discovery service 120, a service registry 122, and an inter-module communication (IMC) runtime 130. Each of these components is described in further detail below.

Computing system 102 may correspond to an electronic device that provides one or more services or functions to a user. For example, computing system 102 may operate as a mobile phone, personal computer (PC), global positioning system (GPS) receiver, portable media player, personal digital assistant (PDA), and/or graphing calculator. In addition, computing system 102 may include an operating system (not shown) that coordinates the use of hardware and software resources on computing system 102, as well as one or more applications (e.g., web browser 110, web application 116) that perform specialized tasks for the user. For example, computing system 102 may include applications such as an email client, address book, document editor, web browser 110, and/or media player. To perform tasks for the user, applications may obtain the use of hardware resources (e.g., processor, memory, I/O components, wireless transmitter, network interface card, graphics-processing unit (GPU), etc.) on computing system 102 from the operating system, as well as interact with the user through a hardware and/or software framework provided by the operating system, as described below.

In one or more embodiments, computing system 102 includes functionality to obtain and/or execute applications using a network connection. In particular, computing system 102 may obtain web application 116 from one or more servers (e.g., server 1 104, server x 106) using a network connection with the server(s) and load web application 116 in web browser 110. For example, web application 116 may be downloaded from an application server over the Internet by web browser 110.

Once loaded, web application 116 may provide features and user interactivity comparable to that of native applications on computing system 102. For example, web application 116 may function as an email client, document editor, media player, computer-aided design (CAD) system, and/or computer game. Web application 116 may also include dynamic user interface elements such as menus, buttons, windows, sub-windows, icons, animations, and/or other graphical objects that emulate analogous user interface elements in native applications. In other words, web application 116 may correspond to a rich Internet application (RIA).

Furthermore, web application 116 may execute on computing system 102 regardless of the type of platform (e.g., operating system, drivers, etc.) associated with computing system 102. Though platform-independent applications such as web application 116 may be more portable and secure than native applications, such cross-platform applications may lack certain performance capabilities of native applications.

More specifically, non-native applications such as web application 116 may be written using scripting languages that are interpreted rather than compiled, such as JavaScript (JavaScript™ is a registered trademark of Sun Microsystems, Inc.). The interpreted nature of web application 116 and/or other non-native applications may result in significantly slower execution times for the non-native applications than those of compiled native applications. Non-native applications may also be unable to utilize low-level libraries and/or application programming interfaces (API) that are available for use by native applications. Consequently, non-native applications may provide limited functionality in certain tasks.

To enable native performance for web applications, computing system 102 may obtain and execute a native code module 118 within plugin 108. Like web application 116, native code module 118 may be obtained from one or more servers (e.g., server 1 104, server x 106) by web browser 110. For example, web application 116 may provide a hyperlink to native code module 118 on the Internet. Web browser 110 may then download native code module 118 from the Uniform Resource Locator (URL) specified in the hyperlink. Alternatively, native code module 118 may be specified by the user or by an external source, such as another web application and/or a native application.

More specifically, native code module 118 may correspond to a software module containing native code that runs directly on hardware provided by computing system 102, such as a CPU. As a result, native code module 118 may be used to perform tasks that require substantial access to CPU resources on computing system 102. For example, native code module 118 may be used by web application 116 to provide computationally intensive features associated with physics simulation, signal processing, artificial intelligence, modeling, and/or analysis.

In one or more embodiments, plugin 108 includes a variety of mechanisms to ensure the safe execution of native code module 118. In particular, native code module 118 may be validated by a validator 112 provided by plugin 108 prior to execution. Native code module validation is described in a co-pending non-provisional application by inventors J. Bradley Chen, Matthew T. Harren, Matthew Papakipos, David C. Sehr, and Bennet S. Yee, entitled, "Method for Validating an Untrusted Native Code Module," having Ser. No. 12/117,634, and filing date 8 May 2008, which is incorporated herein by reference.

Once native code module 118 is validated, native code module 118 may be loaded into a secure runtime environment 114 provided by plugin 108. Native code execution in a secure runtime environment is described in a co-pending non-provisional application by inventors J. Bradley Chen, Matthew T. Harren, Matthew Papakipos, David C. Sehr, Bennet S. Yee, and Gregory Dardyk, entitled, "Method for Safely Executing an Untrusted Native Code Module on a Computing Device," having Ser. No. 12/117,650, and filing date 8 May 2008, which is incorporated herein by reference. Secure runtime environment 114 may also be provided by a web browser extension to web browser 110, and/or secure runtime environment 114 may be built into web browser 110.

Furthermore, because native code module 118 may include binary code that runs directly on hardware, native code module 118 may be platform independent with respect to the operating system of computing system 102, web browser 110, and/or other software components on computing system 102. As described in the above-referenced applications, plugin 108 and/or native code module 118 may also include mechanisms for executing on a variety of instruction set architectures, including the use of "fat binaries" and binary translators.

Those skilled in the art will appreciate that security mechanisms used to execute native code module 118 in secure runtime environment 114 may preclude native code module 118 from accessing system services on computing system 102. In particular, secure runtime environment 114 may restrict communication mechanisms available to native code module 118, as well as access to system resources (e.g., hardware, I/O, network, etc.) on computing system 102 by native code module 118. For example, native code module 118 may be unable to access filesystem services, network communications, hardware-accelerated graphics rendering (e.g., graphics command buffer rendering), and/or audio processing on computing system 102. As a result, native code module 118 may be limited to executing computationally intensive code that does not require the use of system resources on computing system 102.

Those skilled in the art will also appreciate that system services may be provided to native code module 118 by extending the service runtime within secure runtime environment 114. However, extending the service runtime to provide system services to native code module 118 may result in issues with the stability, size, and/or configurability of the service runtime. For example, providing system services through the service runtime may cause the service runtime to behave erratically and/or grow in size and complexity. Along the same lines, system services available on computing system 102 may change over time as system resources are added, removed, and/or updated. Such changes to system services may necessitate frequent changes to the service runtime, which may cause the service runtime to become unstable or unavailable.

To enable system services for native code module 118 without extending the service runtime of secure runtime environment 114, computing system 102 may utilize a set of service modules 128-130. Each service module 128-130 may provide one or more system services to native code module 118. For example, one service module may provide filesystem access to native code module 118, a second service module may provide peer-to-peer network access to native code module 118, and a third service module may enable network capabilities related to HyperText Transfer Protocol (HTTP) for native code module 118.

As shown in FIG. 1, service modules 128-130 associated with native code module 118 are executed within limited runtime environments 124-126. In particular, service module 128 is executed within limited runtime environment 124, and service module 130 is executed within limited runtime environment 126. Alternatively, one or more limited runtime environments 124-126 may include functionality to execute multiple service modules. In one or more embodiments, each service module is executed as a separate process (e.g., operating system process) within the respective limited runtime environment. Furthermore, each service module may be executed within web browser 110, within a plugin for web browser 110, and/or as daemons on computing system 102. Each limited runtime environment 124-126 may further execute each service module 128-130 with a set of reduced privileges that are used to enforce security and/or protect against bugs in the service module.

In particular, the reduced privileges may limit the service module's access to system resources (e.g., I/O devices, GPU, storage, memory, network interface cards, etc.) on computing system 102. For example, limited runtime environment 124 may execute a service module (e.g., service module 128) that provides hardware-accelerated graphics processing with reduced privileges that only allow access to a GPU on computing system 102. Along the same lines, limited runtime environment 126 may execute a service module (e.g., service module 130) that provides filesystem access with reduced privileges that only allow access to one or more hard disk drives on computing system 102. Filesystem access from web applications and/or native code modules is described in a co-pending non-provisional application by inventors Eric Uhrhane and Matthew Papakipos, entitled "Filesystem Access for Web Applications and Native Code Modules," having Ser. No. 12/427,208 and filing date Apr. 21, 2009.

As a result, bugs, errors, failures, and/or exploits associated with each service module 128-130 may at most affect the system resources to which the service module has access. Furthermore, the isolated execution of each service module 128-130 within a limited runtime environment 124-126 may prevent issues (e.g., bugs, errors, failures, attacks, etc.) associated with the service module from affecting other service modules and/or native code module 118.

In one or more embodiments, limited runtime environments 124-126 restrict the privileges of service modules 128-130 by limiting access to system calls from the service modules. For example, each limited runtime environment 124-126 may maintain a list of allowed system calls for the service module 128-130 or service modules executing within the limited runtime environment. The limited runtime environment may also trace the execution of the service module(s) (e.g., using ptrace) to ensure that only allowed system calls are made by the service module. Attempts to make system calls that are not allowed may result in termination of the service module and/or non-execution of the system calls.

Those skilled in the art will appreciate that limited runtime environments 124-126 may utilize a variety of techniques to restrict the privileges of service modules 128-130. Such techniques may be provided by the operating system of computing system 102. For example, the operating system may include functionality to reduce privileges for individual processes based on the processes' permissions, user identifiers (UIDs), and/or other attributes. As a result, executing service modules 128-130 as separate processes may enable a separate set of reduced privileges to be enforced for each service module by the operating system and/or limited runtime environments 124-126. Moreover, separate instances of service modules 128-130 may be executed for each native code module in computing system 102 to prevent one native code module from attacking another native code module through a shared service module. For example, secure runtime environment 114 may execute two native code modules that obtain system services from the same service modules. To maintain isolation between the native code modules, a separate set of service module instances may be executed for each native code module such that no service module instance is shared between the two native code modules. Furthermore, each service module instance may be executed within a separate limited runtime environment instance, or identical service module instances may be executed within one limited runtime environment instance.

As mentioned previously and in the above-referenced applications, secure runtime environment 114 may enforce the safe execution of native code module 118 by isolating native code module 118 from other software components in computing system 102. Similar isolation mechanisms may be used by limited runtime environments 124-126 in executing service modules 128-130. Consequently, native code module 118 may be unable to communicate with service modules 128-130 through conventional inter-process communication (IPC) mechanisms. Instead, an inter-module communication (IMC) runtime 130 may be used to expose services provided by service modules 128-130 in limited runtime environments 124-126 to native code module 118.

In one or more embodiments, IMC runtime 132 provides an IMC channel (e.g., socket, channel of communication, etc.) between native code module 118 and each service module 128-130 used by native code module 118. In addition, IMC runtime 132 may provide one or more shared memory buffers between native code module 118 and each service module 128-130 used by native code module 118. Native code module 118 may request and/or obtain system services from service modules 128-130 through the IMC channels and shared memory buffers. In turn, service modules 128-130 may process the requests and respond through the IMC channels and/or shared memory buffers. For example, native code module 118 may enable audio recording for web application 116 by requesting audio recording services through an IMC channel with an audio-recording service module. The audio-recording service module may access a sound card on computing system 102 to perform the requested services for native code module 118 and place the recorded audio in a shared memory buffer for subsequent use by native code module 118.

IMC runtime 132 may also enable communication between native code module 118 and remotely executing service modules. For example, one or more service modules may execute on servers (e.g., server 1 104, server x 106) associated with web application 116 and/or native code module 118. To enable system services provided by each remote service module, IMC runtime 132 may provide an IMC channel that includes a remote procedure call (RPC) mechanism between native code module 118 and the remote service module. Native code module 118 may then use the RPC mechanism to communicate with the remote service modules and obtain system services from the remote service modules. For example, native code module 118 may read from and write to files stored on a server by communicating with a remote service module that provides filesystem services on the server through an RPC mechanism with the remote service module provided by IMC runtime 132.

Moreover, service modules may be added or removed from limited runtime environments 124-126 without affecting the execution of native code module 118 and/or existing system services available to native code module 118. In particular, service modules 128-130 executing on computing system 102 may be listed in a service registry 122. Service registry 122 may additionally be maintained and updated by discovery service 120. For example, new service modules on computing system 102 may provide discovery service 120 with information such as names and/or system services provided. Discovery service 120 may then add the new service modules and/or system services provided by the new service modules to service registry 122. Additional system services provided by the new service modules may be enabled through IMC runtime 132, which may establish IMC channels and/or shared memory buffers between the new service modules and native code module 118. Discovery service 120 may similarly remove service modules from use by deleting their entries in service registry 122.

Consequently, discovery service 120 may allow native code module 118 to obtain a set of available system services on computing system 102 and access one or more service modules providing the system services. For example, native code module 118 may request a set of system services from discovery service 120. Discovery service 120 may then ascertain the availability of the requested system services by examining service registry 122. If the requested system services are available, either locally or remotely, discovery service 120 may select one or more service modules 128-130 providing the requested system services for use by native code module 118. Finally, discovery service 120 may enable the system services for native code module 118 by directing IMC runtime 132 to create IMC channels, shared memory buffers, and/or other communications mechanisms between the selected service modules and native code module 118.

In addition, discovery service 120 may restrict access to system services from native code module 118 based on a security policy for native code module 118. For example, the security policy may specify a set of permissions regarding access to system services by native code module 118. Discovery service 120 may prevent native code module 118 from using one or more service modules if the security policy does not include permissions for accessing system services provided by the service module(s). In other words, discovery service 120 may not list available system services from the service module(s) if native code module 118 is not allowed to access the service module(s).

Consequently, the execution of service modules 128-130 within limited runtime environments 124-126 may provide a microkernel-based approach to providing system services to native code module 118. Such a microkernel-based approach may maintain the integrity of secure runtime environment 114, reduce the incidence of security exploits and bugs, allow for configurability of system services during the execution of native code module 118, and/or enable the separation of mechanism and policy in both native code module 118 and service modules 128-130.

Figure 2:
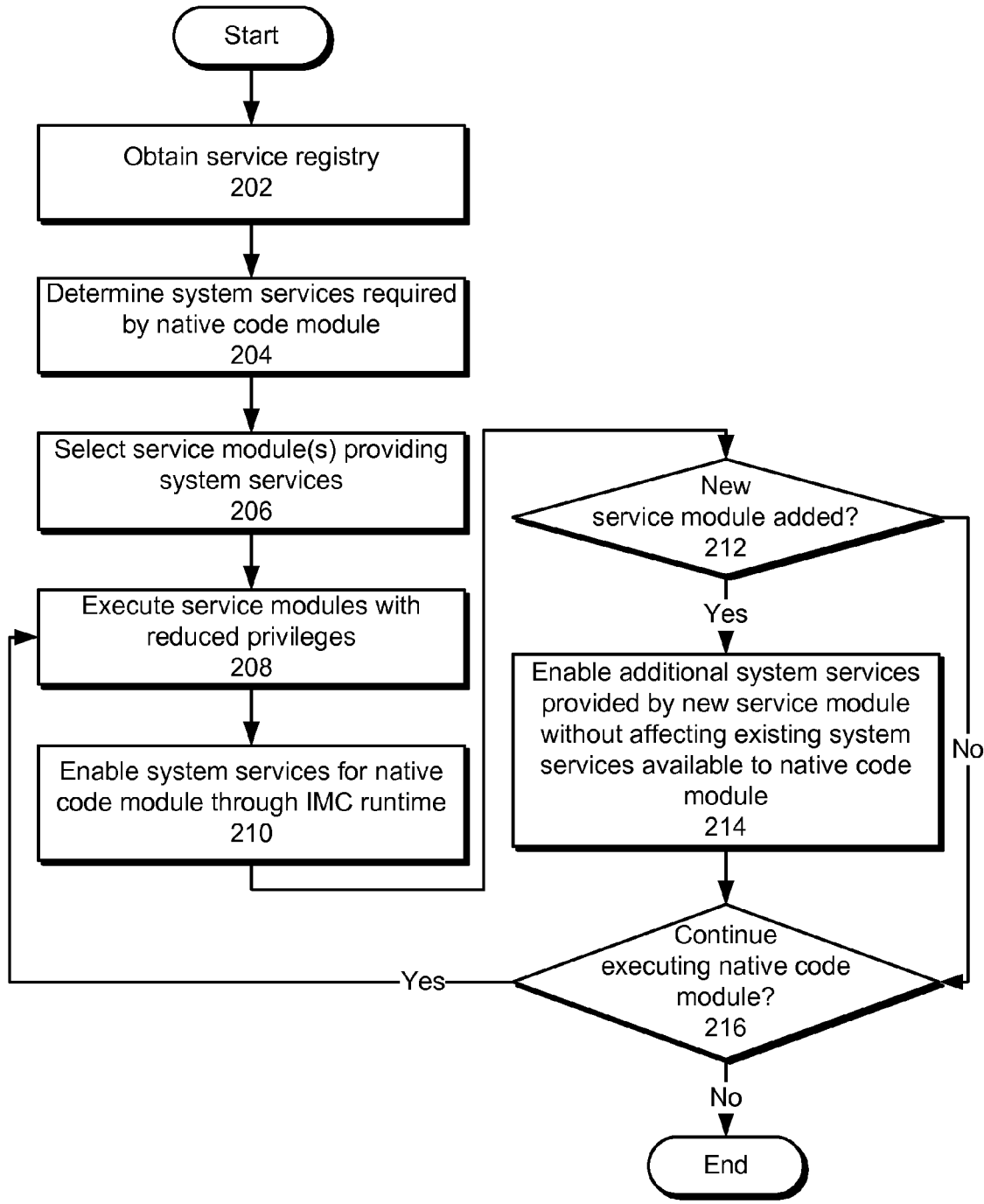
FIG. 2 shows a flowchart illustrating the process of facilitating the execution of a native code module.

FIG. 2 shows a flowchart illustrating the process of facilitating the execution of a native code module. In one or more embodiments, one or more of the steps may be omitted, repeated, and/or performed in a different order. Accordingly, the specific arrangement of steps shown in FIG. 2 should not be construed as limiting the scope of the technique.

Initially, a service registry is obtained (operation 202). The service registry may include a set of service modules that provide system services such as filesystem access, graphics command buffer rendering, audio processing, and/or network access to the native code module. In addition, the service registry may be maintained by a discovery service (e.g., discovery service 120 of FIG. 1) that communicates with both the service modules and the native code module. As a result, the discovery service may determine a set of system services required by the native code module (operation 204). For example, the discovery service may communicate with the native code module and/or examine configuration settings associated with the native code module to determine the system services required by the native code module.

Next, the discovery service may select one or more service modules providing the system services required by the native code module (operation 206). The service module(s) may be selected based on a security policy that specifies permissions for the native code module. If the security policy restricts access to a particular service module and/or system service, the discovery service may not select the service module and/or system service for use by the native code module. Furthermore, the native code module may be unable to execute if the security policy for the native code module denies access to a critical system service and/or service module.

Each of the service modules is then executed, locally or remotely, with a set of reduced privileges (operation 208). The reduced privileges may limit the service module's access to system resources and minimize the occurrence of bugs and/or exploits in the service module. For example, service modules providing network access may only access network interface cards, service modules providing filesystem access may only access storage devices, service modules providing audio processing may only access sound cards, and/or service modules providing graphics processing may only access graphics hardware.

Next, the system services are enabled for the native code module through an IMC runtime (operation 210) that facilitates communication between the native code module and the selected service modules. As described above, the IMC runtime may provide an IMC channel (e.g., socket) between the native code module and each service module. If the service module is executed remotely, the IMC channel may include an RPC mechanism. The IMC runtime may also provide one or more shared memory buffers between the native code module and each service module to facilitate the transfer of data between the native code module and the service module.

A new service module may also be added (operation 212) to the service registry during the execution of the native code module. If a new service module is added, additional system services provided by the new service module are enabled for the native code module without affecting existing system services available to the native code module from other service modules. In particular, the new service module may be executed with reduced privileges, and the additional system services provided by the new service module may be added to the service registry for retrieval by the discovery service and/or the native code module. If the native code module wishes to use the additional system services and the security policy allows for use of the additional system services, the IMC runtime may set up an IMC channel and/or shared memory buffer between the native code module and the new service module.

The native code module may continue executing (operation 216) during use by a web application (e.g., web application 116 of FIG. 1). As the native code module executes, the service modules are also executed with reduced privileges (operation 208), and system services provided by the service modules are enabled through the IMC runtime (operation 210). New service modules may also be added to the service registry (operation 212), and additional system services provided by the new service modules may be enabled for the native code module without affecting existing system services available to the native code module (operation 214). System services may thus be provided to the native code module until the native code module has finished executing.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the present embodiments. The scope of the embodiments is defined by the appended claims.

What is claimed is:

1. A computer-implemented method for facilitating execution of a native code module on a computing system, wherein the native code module includes untrusted code, the method comprising:
   obtaining a service registry that includes service modules, wherein each service module provides at least one system service;
   identifying one or more system services that are required by the native code module during execution of the native code module on the computing system;
   selecting, from among the service modules included in the service registry, one or more service modules that provide the identified one or more system services; and
   providing an inter-module communication (IMC) runtime that exposes the identified one or more system services to the native code module, including providing a respective IMC channel to enable communication between the native code module and each of the selected one or more service modules;
   adding a new service module to the service registry;
   enabling, for the native code module, additional system services provided by the new service module through the IMC runtime without affecting existing system services available to the native code module from the selected one or more service modules; and
   restricting access to the system services from the native code module based on a security policy for the native code module.

2. The computer-implemented method of claim 1, further comprising:
   executing each of the selected one or more service modules with reduced privileges.

3. The computer-implemented method of claim 2, wherein the reduced privileges are enforced by limiting access to system calls from the selected one or more service modules.

4. The computer-implemented method of claim 1, wherein the system services correspond to at least one of filesystem access, graphics command buffer rendering, audio processing, and network access.

5. The computer-implemented method of claim 1, wherein each of the selected one or more service modules is executed locally or remotely.

6. A system for facilitating execution of a native code module, the system comprising:
   one or more computers including:
      a service registry that includes service modules, wherein each service module provides at least one system service;
      a discovery service configured to:
         identify one or more system services required by the native code module during execution of the native code module on the system; and
         select, from among the service modules included in the service registry, one or more service modules that provide the identified one or more system services;
      an inter-module communication (IMC) runtime configured to expose the identified one or more system services to the native code module, including provide a respective IMC channel to enable communication between the native code module and each of the selected one or more service modules;
wherein the native code module includes untrusted code;
a computer readable storage medium storing instructions that, when executed by the one or more computers, cause the one or more computers to provide one or more limited runtime environments, each configured to execute a respective selected service module with a set of reduced privileges, wherein the reduced privileges are enforced by limiting access to system calls from the selected one or more service modules.

7. The system of claim 6,
wherein the discovery service is further configured to add a new service module to the service registry, and
wherein the IMC runtime is further configured to enable, for the native code module, additional system services provided by the new service module without affecting existing system services available to the native code module from other service modules.

8. The system of claim 6, wherein the IMC runtime is further configured to restrict access to the system services from the native code module based on a security policy for the native code module.

9. The system of claim 6, wherein the system services correspond to at least one of filesystem access, graphics command buffer rendering, audio processing, and network access.

10. The system of claim 6, wherein each of the selected one or more service modules is executed locally or remotely.

11. A computer-readable storage medium storing instructions that when executed by one or more computers cause the one or more computers to perform a method for facilitating execution of a native code module, wherein the native code module includes untrusted code, the method comprising:
obtaining a service registry that includes service modules;
identifying one or more system services required by the native code module during execution of the native code module on the one or more computers;
selecting, from among the service modules included in the service registry, one or more service modules that provide the identified one or more system services;
providing an inter-module communication (IMC) runtime that exposes the identified one or more system services to the native code module, including providing a respective IMC channel to enable communication between the native code module and each of the selected one or more service modules;
adding a new service module to the service registry;
enabling, for the native code module, additional system services provided by the new service module through the IMC runtime without affecting existing system services available to the native code module from the selected one or more service modules; and
restricting access to the system services from the native code module based on a security policy for the native code module.

12. The computer-readable storage medium of claim 11, the method further comprising:
executing each of the selected one or more service modules with a set of reduced privileges.

13. The computer-readable storage medium of claim 12, wherein the reduced privileges are enforced by limiting access to system calls from the selected one or more service modules.

14. The computer-readable storage medium of claim 11, wherein the system services correspond to at least one of file system access, graphics command buffer rendering, audio processing, and network access.

15. The computer-readable storage medium of claim 11, wherein at least some of the selected service modules are executed locally and at least some of the selected service modules are executed remotely.

16. A system for facilitating execution of a native code module on a computing system, wherein the native code module includes untrusted code, the system comprising:
one or more computers including:
a service registry that includes service modules, wherein each service module provides at least one system service;
a computer-readable storage medium storing instructions that, when executed by the one or more computers, cause the one or more computers to perform a method comprising:
identifying one or more system services that are required by the native code module during execution of the native code module on the system;
selecting, from among the service modules included in the service registry, one or more service modules that provide the identified one or more system services;
providing an inter-module communication (IMC) runtime that exposes the identified one or more system services to the native code module, including providing a respective IMC channel to enable communication between the native code module and each of the selected one or more service modules;
adding a new service module to the service registry;
enabling, for the native code module, additional system services provided by the new service module through the IMC runtime without affecting existing system services available to the native code module from the selected one or more service modules; and
restricting access to the system services from the native code module based on a security policy for the native code module.

17. The system of claim 16, wherein the method further comprises:
executing each of the selected one or more service modules with reduced privileges.

18. The system of claim 17, wherein the reduced privileges are enforced by limiting access to system calls from the selected one or more service modules.

19. The system of claim 16, wherein the system services correspond to at least one of filesystem access, graphics command buffer rendering, audio processing, and network access.

20. The system of claim 16, wherein each of the selected one or more service modules is executed locally or remotely.

* * * * *

UNITED STATES PATENT AND TRADEMARK OFFICE
CERTIFICATE OF CORRECTION

PATENT NO.      : 8,271,995 B1
APPLICATION NO. : 12/415434
DATED           : September 18, 2012
INVENTOR(S)     : Matthew Papakipos and Antoine Labour It is certified that error appears in the above-identified patent and that said Letters Patent is hereby corrected as shown below:

In the Claims:

In column 12, Claim 14, lines 6-7, delete "file system" and insert -- filesystem --.

Signed and Sealed this
Twentieth Day of November, 2012

David J. Kappos
*Director of the United States Patent and Trademark Office*